United States Patent [19]

Tee et al.

[11] 4,178,435

[45] Dec. 11, 1979

[54] RECOVERY PROCESS FOR BRANCHED POLYPHENYLENE

[75] Inventors: Liong S. Tee, Naperville, Ill.; John C. Reindl, Troy, Mich.

[73] Assignee: Standard Oil Company (Indiana), Chicago, Ill.

[21] Appl. No.: 865,400

[22] Filed: Dec. 29, 1977

Related U.S. Application Data

[63] Continuation-in-part of Ser. No. 752,516, Dec. 20, 1976, abandoned.

[51] Int. Cl.$^2$ ............................................. C08G 61/10
[52] U.S. Cl. ..................................... 528/501; 528/396
[58] Field of Search ............... 260/2 H, 670; 528/501, 528/396

[56] References Cited

U.S. PATENT DOCUMENTS

| | | | |
|---|---|---|---|
| 3,280,091 | 2/1963 | Dance | 528/501 |
| 3,582,498 | 6/1971 | Bilow et al. | 260/2 H |

*Primary Examiner*—Wilbert J. Briggs, Sr.
*Attorney, Agent, or Firm*—Wallace L. Oliver; Arthur G. Gilkes; William T. McClain

[57] ABSTRACT

An improved method for separating branched polyphenylene from a polymerization reaction mixture is disclosed which improves polymer properties. The contents of a high pressure polymerization reactor are discharged into one or more devolatilizing units which draw off and recycle low molecular weight unreacted species and separate high molecular weight branched polyphenylene.

4 Claims, 1 Drawing Figure

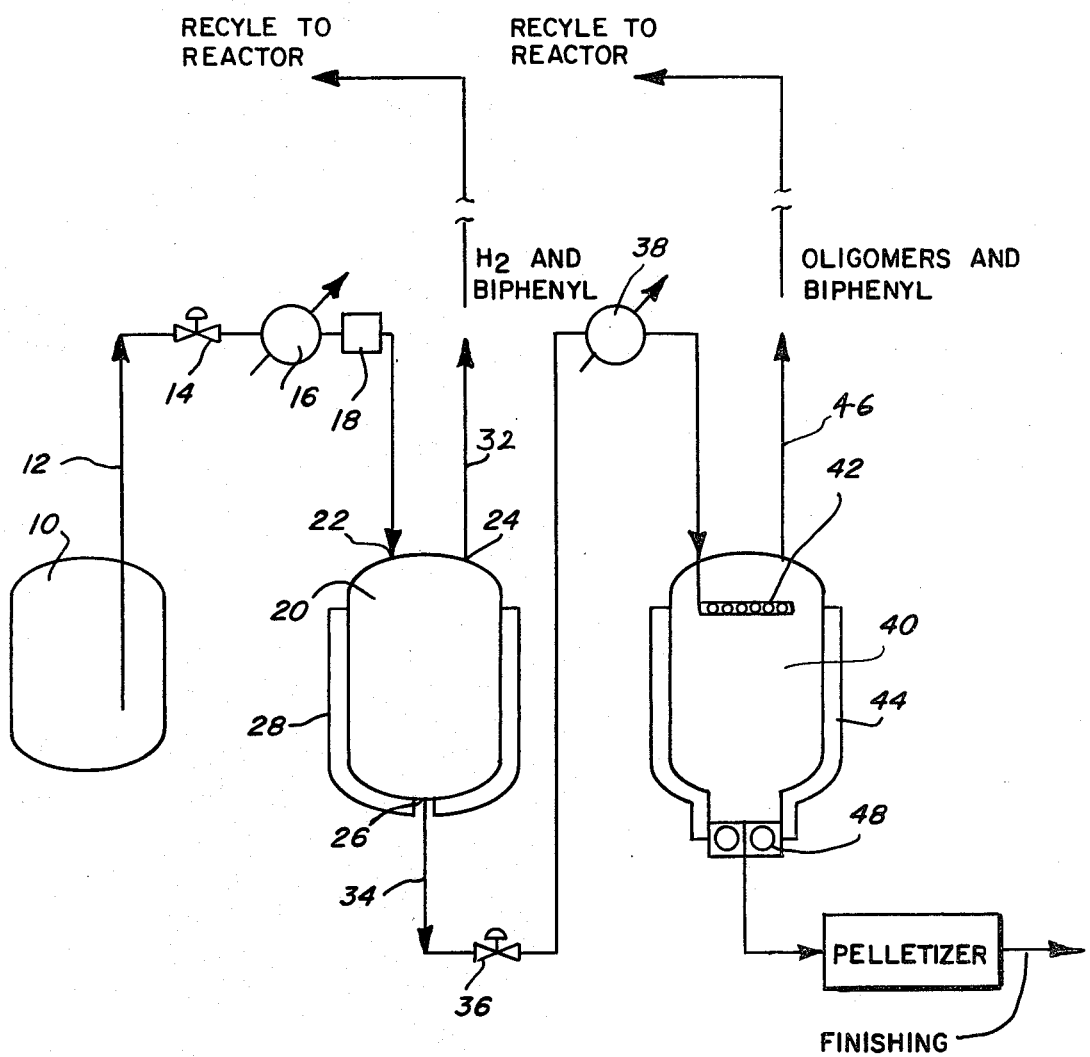

RECOVERY PROCESS FOR BRANCHED POLYPHENYLENE

CROSS REFERENCE TO RELATED APPLICATION

This is a continuation-in-part of application Ser. No. 752,516 filed Dec. 20, 1976, now abandoned.

BACKGROUND OF THE INVENTION

This invention relates to branched polyphenylenes and particularly relates to an improved process for producing high molecular weight branched polyphenylenes.

There is a need for polymeric materials which can withstand mechanical stress under high temperature conditions. Such materials have utility in applications such as in electronic circuit boards and in mechanical seals. Among the polymers which have shown good high temperature properties are branched polyphenylenes. In general, polyphenylenes are polymers composed essentially of carbon and hydrogen in aromatic ring type structures with the rings chemically linked to each other through the ortho, meta and para positions. Such polymers are to be distinguished clearly from other chemically similar phenylene type structure, such as polyphenylene oxide, polyphenylene sulfide, polyphenylene sulfone and other polymers containing the designation "phenylene." Ordinary polyphenylenes generally have been produced by techniques such as acid catalyzed oxidative coupling of the benzene ring in various aromatic compounds and such polyphenylenes possess some degree of high temperature thermal stability, but they are generally linear (parapolyphenylene) polymers which are relatively insoluble and infusable. Polyphenylenes have been produced which do possess certain limited solubility, but these have generally been at number average molecular weights of only about 1000 to 2000. Generally, these low molecular weight polyphenylenes contain only a low degree of branching, that is, they are still relatively linear polymers which contain long linear segments.

The branched polyphenylenes produced using the process of this invention are those novel polyphenylenes disclosed by Wennerberg and Wang in U.S. Pat. No. 3,792,099 and produced by the process described in U.S. Pat. Nos. 3,829,518 and 3,798,182, all of which are incorporated by reference herein. These polyphenylenes possess increased solubility over prior art polyphenylenes and excellent thermal stability over a number average molecular weight range from 1000 to over 10,000.

In a process for the production of branched polyphenylene, such as described in U.S. Pat. Nos. 3,829,518 and 3,798,281 branched polyphenylene is formed by treating an aromatic hydrocarbon or a mixture of aromatics and partially hydrogenated aromatics with a metal oxide catalyst in the presence of hydrogen at above about 400° C. Typically, the crude polyphenylene is dissolved in a high boiling solvent such as trichlorobenzene or N-methyl-2-pyrrolidone (NMP) and the product is recovered by treating such mixture with an antisolvent such as pentane, hexane, or methanol. In a large-scale production of branched polyphenylene the use of large volumes of such solvents is costly, energy consuming, and environmentally detrimental. A method that would eliminate the use of solvent in the purification step is needed. Further, a method that conveniently would produce high molecular weight branched polyphenylenes also is desired.

SUMMARY OF THE INVENTION

This invention comprises discharging the contents of a high pressure polymerization reactor for branched polyphenylene into one or more devolatilizing units which remove low molecular weight unreacted species and collecting the separated branched polyphenylene.

BRIEF DESCRIPTION OF THE DRAWING

The FIGURE shows a branched polyphenylene polymerization reactor and two devolatilizing units used in this invention.

BRIEF DESCRIPTION OF THE INVENTION

Branched polyphenylenes are formed at high temperatures and pressures in a one or two step process from aromatics or a mixture of aromatics and partially hydrogenated aromatics in the presence of hydrogen. The polymerization reaction can be performed either in a batch or in a continuous process. Typically, the aromatic constituent and a catalyst are changed to an agitated reactor which then is flushed with an inert gas such as nitrogen to remove oxygen and moisture. The reactor is heated and pressured with hydrogen to the reaction temperature and pressured for several hours after which time the reactor is cooled and the hydrogen vented.

Conventionally, the polymer is dissolved in a solvent, such as trichlorobenzene or NMP, and then pumped from the reactor, through a filter, to a polymer recovery unit where the polymer is precipitated by adding an antisolvent and then filtered and dried.

Our invention comprises discharging the contents of the polymerization reactor at high pressure into one or more devolatilizer units which remove and recycle hydrogen, unreacted monomer and low molecular weight oligomers. The effect of this flash devolatilization step is to avoid the need for solvent recovery and to increase the molecular weight of the branched polyphenylene product.

More particularly, after polymerization, the contents of the polymerization reactor pressured above about 1000 psi is discharged into a devolatilizing chamber maintained at a temperature and at a suitable pressure less than the reactor pressure such that the more volatile components of the reaction mixture can be drawn off from the devolatilizer as vapors. The remaining branched polyphenylene then can be transferred to a pelletizer and polymer finishing operation. Since typically the devolatilizing chambers are maintained at temperatures above the melting point of branched polyphenylene (typically about 250° C.), polyphenylene exists in such chambers in a liquid or semi-liquid state. Preferably, polyphenylene is removed from the devolatilizing chambers by pumping molten polymer through a melt pump. Alternatively, if the chamber is allowed to cool, devolatilized branched polyphenylene can be removed as a solid.

In the general concept of this invention, branched polyphenylene is separated from unreacted monomer, hydrogen and oligomers by transferring such mixture to a devolatilizer. The specific temperature and pressure of such devolatilizer are chosen such that at least one of the mixture components is vaporized and thus can be withdrawn from the devolatilizing chamber. More than one devolatilizer can be used such that each is maintained at a temperature and pressure which will vaporize successively each unwanted component. Generally, each successive devolatilizing chamber after the polymerization reactor is maintained at a lower pressure. For example, the pressure in the first devolatilizer is lower than that in the reactor and higher than that in a second devolatilizer. Typically, in a system in which two devolatilizers are used, the first unit removes the hydrogen and most of the unreacted monomer while the second devolatilizer removes the remaining monomer and low molecular weight oligomers. If three devolatilizers are used, hydrogen and unreacted monomer are removed separately. Generally, the component with the highest vapor pressure will be removed first.

Usually, the vaporized products removed from each devolatilizer are recycled to the polymerization reactor which forms a closed, environmentally-advantageous system. Alternatively, the vaporized products can be isolated and used separately. Thus, if desired, oligomers can be separated and used for different purposes.

The monomer which is polymerized to branched polyphenylene can be a variety of aromatic or partially hydrogenated aromatic compounds and preferably is biphenyl. Catalyst useful in forming branched polyphenylenes include metal oxides such as molybdenum oxide, calcium oxide, sodium oxide, and the like, which can be supported on alumina. The preferable catalyst is molybdenum oxide supported on alumina. Typically, in a branched polyphenylene polymerization reaction, the pressure is between 1000 and 3000 psi and usually is about 2000 psi, and the temperature is about 400° to 600° C. More details describing other monomers, catalysts and reaction conditions are found in U.S. Pat. Nos. 3,792,099, 3,798,281 and 3,829,518.

In a two devolatilizer system the contents of the polymerization reactor are discharged into a first devolatilizing chamber maintained at a pressure below about 300 psig and at a temperature between 300° and 600° C., preferably between about 400° and 500° C. After a time sufficient to vaporize a majority of unreacted monomer, the volatile material is withdrawn and preferably recycled and the non-volatile material is transferred to a second devolatilizing chamber, typically, maintained at a pressure below about 10 psig, preferably below atmospheric and most preferably about one torr at a temperature between about 300° and 600° C., preferably between about 400° and 500° C. for a time sufficient to vaporize the remaining unreacted monomer and low molecular weight oligomers which usually is about 30 minutes. The specific temperature and pressure selected for each devolatilizer depends on the vapor pressure of the material which is to be vaporized at such point and can easily be chosen by the skilled artisan.

A typical branched polyphenylene recovery system of this invention is shown in the FIGURE. Branched polyphenylene is polymerized from biphenyl using a molybdenum oxide-alumina catalyst in reactor 10, in which a pressure of above about 1000 psig is maintained above about 400° C. Polymer is transferred from such reactor through a transfer line 12 and pressure reducing valve 14 into devolatilizing chamber 20. Optionally, a cooler 16 may be inserted in the transfer line to maintain a suitable temperature. Also, catalyst filter 18 may be required to prevent catalyst from entering the devolatilizing units. Devolatilizing chamber 20 is fitted with inlet 22 and outlets 24 and 26 and typically is jacketed with insulation 28 and can be heated for isothermal operation.

The pressure in devolatilizer 20 is maintained at about 150 to 300 psi at a temperature between about 400° and 500° C. such that hydrogen and unreacted biphenyl monomer is vaporized. The volatile materials are drawn off through outlet 24 and are recycled to the reactor through transfer line 32. The remaining non-volatile material is removed through outlet 26 to a transfer line 34 and through pressure reducing valve 36 into a second devolatilizer 40. Optionally, a heater 38 may be inserted in transfer line 34 to maintain a suitable temperature. Preferably, polymer enters devolatilizer 40, which is jacketed by insulation 44 and can be heated, through a stranding pipe 42. Preferably, the pressure in the second devolatilizer 40 is less than atmospheric and typically can be as low as about one torr. The temperature is such devolatilizer 40 is maintained between about 400° and 600° C. such that remaining unreacted biphenyl and low molecular weight oligomers are vaporized and can be drawn off through transfer line 46 and recycled to the reactor. Completely devolatilized branched polyphenylene then is pumped through gear pump 48 to a pelletizer and then to a polymer finishing system.

Besides the cost and energy saving associated with this invention, a definite improvement in product properties is observed when this invention is used to separate branched polyphenylene from the reaction mixture. Generally, branched polyphenylene recovered using the process of this invention, shows a higher inherent viscosity (IV) and higher softening point than a branched polyphenylene formed under similar conditions but recovered by solvent extraction. Thus a sample of branched polyphenylene which when recovered by solvent extraction had an IV of 0.08 and a softening point of 200° C., exhibited an IV of 0.17 and a softening point of 285° C. when devolatilized at a temperature of 440° C. at 1.5 torr for 30 minutes.

We claim:

1. A process for separating branched polyphenylene from a polymerization reaction mixture comprising branched polyphenylene formed by a metal oxide catalyst, hydrogen and unreacted monomer comprising the steps (a) discharging said reaction mixture from a polymerization reactor held at a pressure above about 1000 psig and at a temperature above about 400° C. into a first devolatilizing chamber maintained at a pressure below about 300 psig and at a temperature between about 300° and 600° C.; (b) after a time sufficient to remove a majority of unreacted monomer, removing volatile components from such first devolatilizing chamber; (c) transferring the remaining non-volatile components to a second devolatilizing chamber maintained at a pressure below atmospheric and at a temperature between about 400° and 500° C. for about 30 minutes; and (d) recovering the branched polyphenylene from such second devolatilizing chamber.

2. The process of claim 1 wherein the first devolatilizing chamber is maintained at a pressure of about 200 psig and at a temperature between about 400° and 500° C. and the second devolatilizer is maintained at a pressure below atmospheric and at a temperature between about 400° and 500° C.

3. The process of claim 1 wherein the volatile materials removed from each devolatilizing chamber are recycled to the polymerization reactor.

4. The process of claim 1 wherein the polymerization reactor is charged with biphenyl monomer and an effective catalytic amount of molybdenum oxide supported on alumina.

* * * * *